United States Patent [19]

Lewis

[11] 4,056,317

[45] Nov. 1, 1977

[54] APPARATUS FOR SELECTIVELY MODULATING THE COLOR OF LIGHT BEAM PATHS OF PHOTOGRAPHIC COLOR RECORDERS

[76] Inventor: John Hopkins Lewis, 32 Franklin Road, Teaneck, N.J. 07666

[21] Appl. No.: 657,254

[22] Filed: Feb. 11, 1976

[51] Int. Cl.² .......................................... G03B 27/32
[52] U.S. Cl. ...................................... 355/32; 355/71; 355/88; 350/316
[58] Field of Search ................ 355/32, 35, 71, 88, 355/36, 38, 30, 33, 34, 37; 352/222, 45, 105, 106, 113, 66, 60; 350/316

[56] References Cited

U.S. PATENT DOCUMENTS

| | | | |
|---|---|---|---|
| 2,822,729 | 2/1958 | Capatosto | 355/71 |
| 3,554,641 | 1/1971 | Jeffee | 355/30 |
| 3,813,160 | 5/1974 | Nowak | 355/71 |
| 3,892,482 | 7/1975 | Weisglass | 355/35 |
| 3,907,427 | 9/1975 | Tschink | 355/71 |
| 3,927,941 | 12/1975 | Yamaguchi | 355/71 |

*Primary Examiner*—Monroe H. Hayes
*Attorney, Agent, or Firm*—Watson, Leavenworth, Kelton & Taggart

[57] ABSTRACT

Apparatus for selectively inserting into and withdrawing color absorption filters from the light beam paths or photographic color recorders, e.g., of the aerial image and enlarger types. Includes a housing defining a plural-section chamber and having opposed and spaced sidewalls with the latter in an operational section of the chamber having substantially aligned windows closed by suitable optical transparencies through which the light beam path of a photographic color recorder may extend upon suitable beam-intercepting support of this housing in a certain orientation. A plurality of substantially parallel, planar color absorption filters, having substantially uniform indices of refraction, are arranged in three different groups within a storage section of the chamber that is offset from the windowed operational section. Guide means define substantially parallel paths of planar motion of the filters between the chamber storage and operational sections, and also support them in substantially parallel positions intervening the windows. Means are provided which seal at least the sides and bottoms of the chamber storage and operational sections in a liquid-tight manner, and a body of transparent colorless liquid which has an index of refraction substantially equal to that of the filters is located in these chamber sections in a quantity which maintains immersion therein of the filters in their positions of storage and operation and movements therebetween.

11 Claims, 10 Drawing Figures

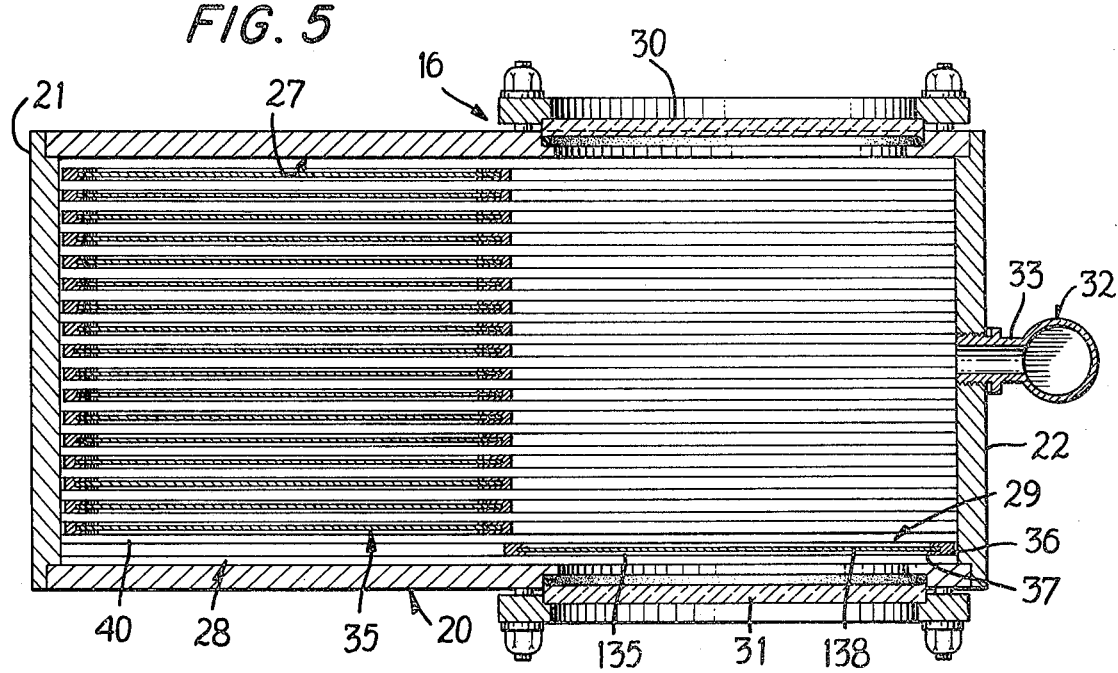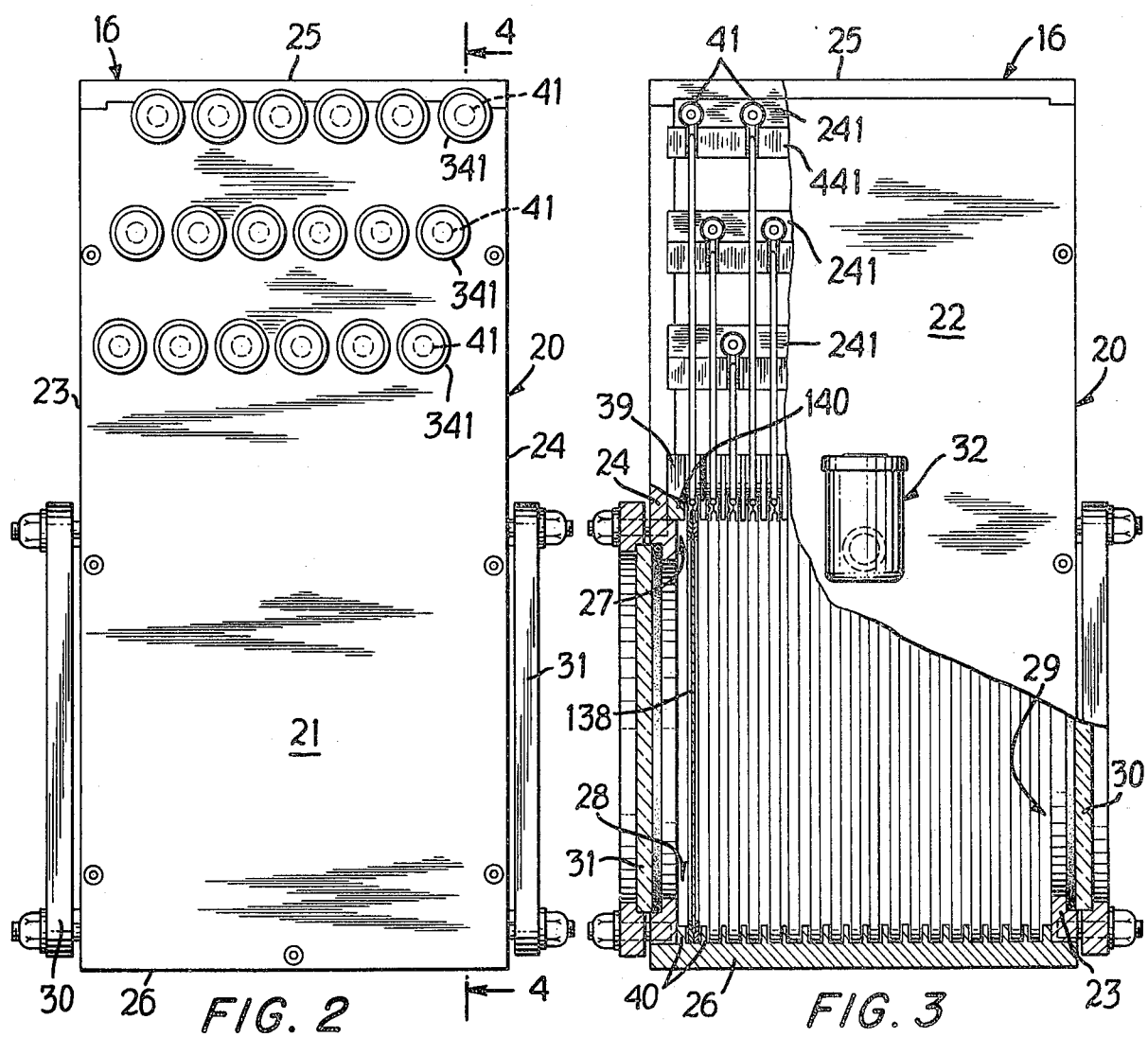

APPARATUS FOR SELECTIVELY MODULATING THE COLOR OF LIGHT BEAM PATHS OF PHOTOGRAPHIC COLOR RECORDERS

BACKGROUND AND SUMMARY

The present invention relates to photographic color printing which requires a light source whose component color intensities are precisely controlled, and it is known that selective color modulaion of light may be accomplished with color absorption filters. Accurately calibrated color absorption filters are available in glass, acetate and gelatin sheets, but these all present problems in use in manners previously proposed. Handling accidents tend to break glass filters as does overheating. Acetate and gelatin filters scratch easily and heat tends to cause them to warp and buckle. Each surface of such a filter causes a minimum reflection light loss of about 5%. Soiling, scratching and buckling can increase such light losses to as much as about 40%, which destroys calibration precision and this is particularly troublesome when a number of such filters are used together to obtain a required color balance. Either packs of a half dozen or more filters must be used and tediously manually manipulated or a very large stock of filters must be availabe for slow and laborious selections therefrom.

It is a general object of the present invention to avoid or substantially reduce such difficulties in a simple and economical manner which assures obtainment of reliable results not heretofore readily attainable.

The present invention may feature the provision in photographic color recording devices such as optical printers of the type having a plurality of projector heads, e.g., horizontally axially aligned aerial image and master projector heads as taught in the United States Oxberry Pat. No. 3,040,619 of June 26, 1962; or in photographic color enlargers of well-known types wherein there are vertically aligned, in successive order downward, the lamp, negative holder, lens board and lens, and the usual bottom easel; of a cell containing a plurality of movable color absorption filters selectively manipulative into and out of alignment with the photographic beam of the apparatus and maintained submerged in a transparent and colorless liquid having an index of refraction substantially equal to that of the material of the filters. Reflection and refraction at surfaces are substantially eliminated and heat generated by the absorption of light energy is efficiently dissipated. The number of filters to be used together is limited only by function and space design. When this cell is constructed as a housing having a liquid-tight chamber as a part or the whole of the interior thereof in which the filters-submerging liquid body is confined for maintaining such submergence and that of the inner faces of the opposed windows and all other interior optical means, a reasonably large number of filters may be used therein with no apreciable deterioration in the efficiency of the system. Further, a desired filter value may be attained by a combination of smaller basic filters together so that the sums of the color densities thereof will substantially equal the desired amount. Through a judicious choice of basic filters one may combine them in various ways to obtain a wide range of component color intensities. The desired results may be consistently repeatable since the filters do no materially deteriorate.

Apparatus to perform these valuable functions in a relatively simple and easily realized and reliable manner may include a housing defining a plural-section chamber that has opposed and spaced sidewalls with the latter in an operational section of the chamber being provided with opposite windows closed by suitable optical transparencies through which the light beam path of a photographic color recording device may extend when this housing is supported in a beam-intercepting manner. A stack of planar color absorption filters, having substantially uniform indices of refraction, are arranged in three separate groups within a storage section of the chamber that is offset from the windowed operational section with those in one group being of the color cyan, those in a second group being of the color magenta and those in the third group being of the color yellow. Cyan modulates or controls how much of the red rays pass through, (2) magenta controls how much of the green rays pass through, and (3) yellow controls how much of the blue rays pass through; and thus they may be considered respectively to be, in terms of function, (1) white minus red, (2) white minus green, and (3) white minus blue. Manipulative means are provided which are capable of moving individually selectively each of these filters from the stack in the chamber storage section to positions of stacking between the windows and back again into the storage section.

At least the sides and bottoms of the entire chamber including its storage and operational sections are sealed in a liquid-tight manner. A body of transparent colorless liquid having a refractive index substantially equal to that of the filters is located in the chamber and its sections in a quantity to maintain immersion therein of the filters in their positions of storage and operation and movements therebetween, as well as the interior surfaces of the window transparencies.

Gelatin filters, which are preferred, are sheets of substantially pure gelatin except that they contain dyes which absorb specific color components of light. These have a specific index of refraction and are available in precisely calibrated color correcting form with color density multiples of 0.025. Consequently, the filtering capabilities of multiples thereof may vary from 0.025 to 1.575. The index of refraction of such gelatin filters is about 1.52 at the working temperatures thereof in apparatus of the present invention, and tetrachloroethylene has an index of refraction of about 1.51, which makes it ideal for use in practice of the present invention. Due to this substantial equality of these refractive indices there is no appreciable amount of light loss, if any, due to reflection in these apparatus, and no discernible directional disturbance of any light rays as they pass into, through, and out of an immersed gelatin filter sheet. Accordingly, if a clear gelatin filter sheet is kept clean by practice of the present invention it has no effect on the light beams passing through it due to the maintained immersion therein within the liquid bath.

In preferred forms of the present apparatus guide means are provided which define substantially parallel paths of planar motion of the filters between the chamber storage and opertional sections, and which also support them in substantially parallel positions intervening the windows. Manipulative means are provided for moving individually each of the filters along its path of planar motion between the storage section and the position intervening the windows as dictated by its guide means.

Additional objects are to provide such supplemental equipment for standard photographic color recording equipment which is relatively simple in construction and operation and requires relatively low cost to manufacture and maintain with the latter and the operation being quite easy to realize. Also optical precision and the ability to obtain with assurance precise color modulation are simply attainable.

Other objects of the invention will in part be obvious and will in part appear from reference to the following detailed description taken in connection with the accompanying drawings, wherein like numerals identify similar parts throughout, and in which:

FIG. 2 is an end elevational view to enlarged scale of the color absorption filters unit embodied in FIG. 1;

FIG. 3 is an elevational view of the opposite end of the unit shown in FIG. 2, with parts broken away and in section taken substantially on line 3—3 of FIG. 4;

FIG. 5 is a sectional view taken substantially on line 5—5 of FIG. 4;

Figure 6:
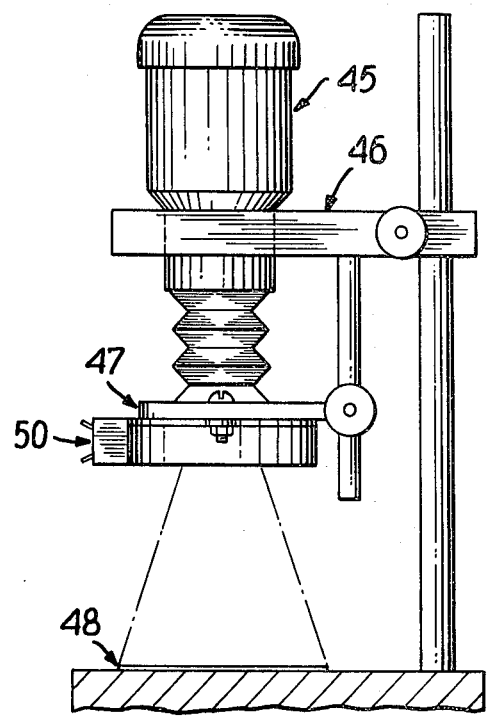
Figure 7:
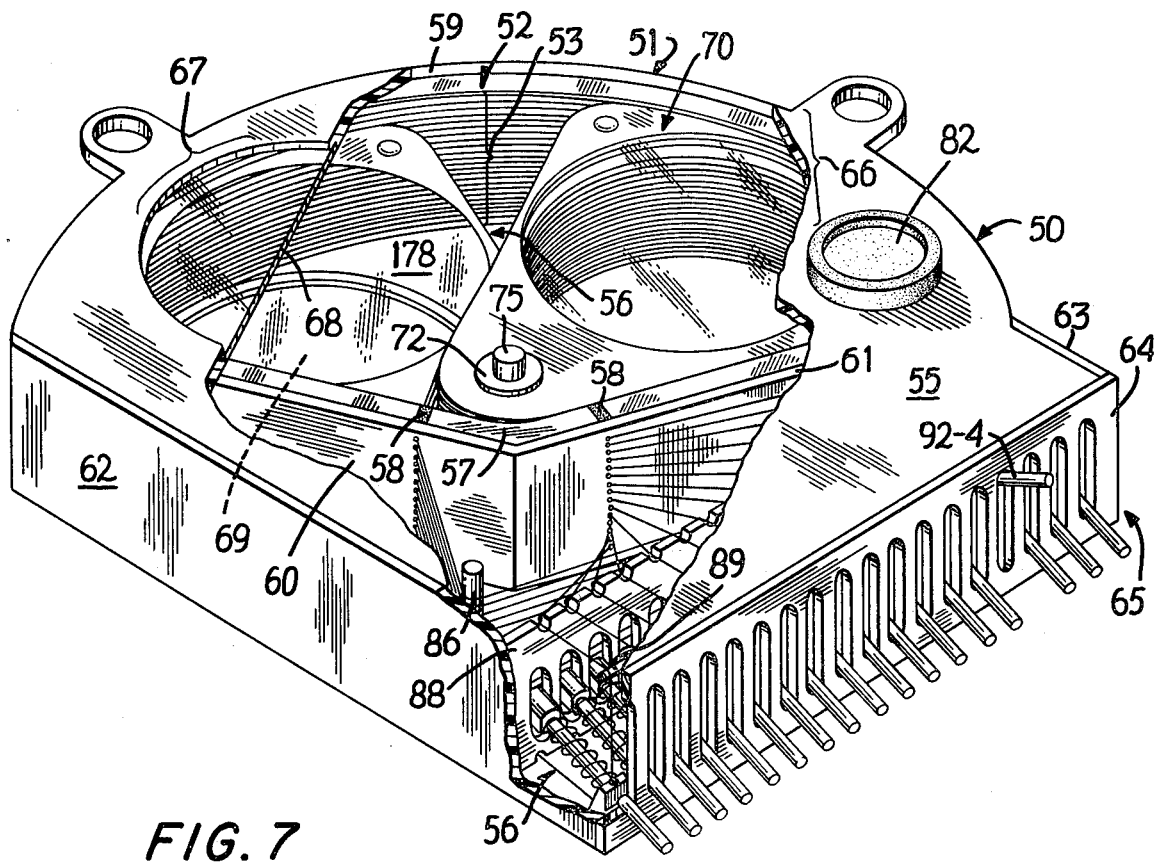
Figure 8:
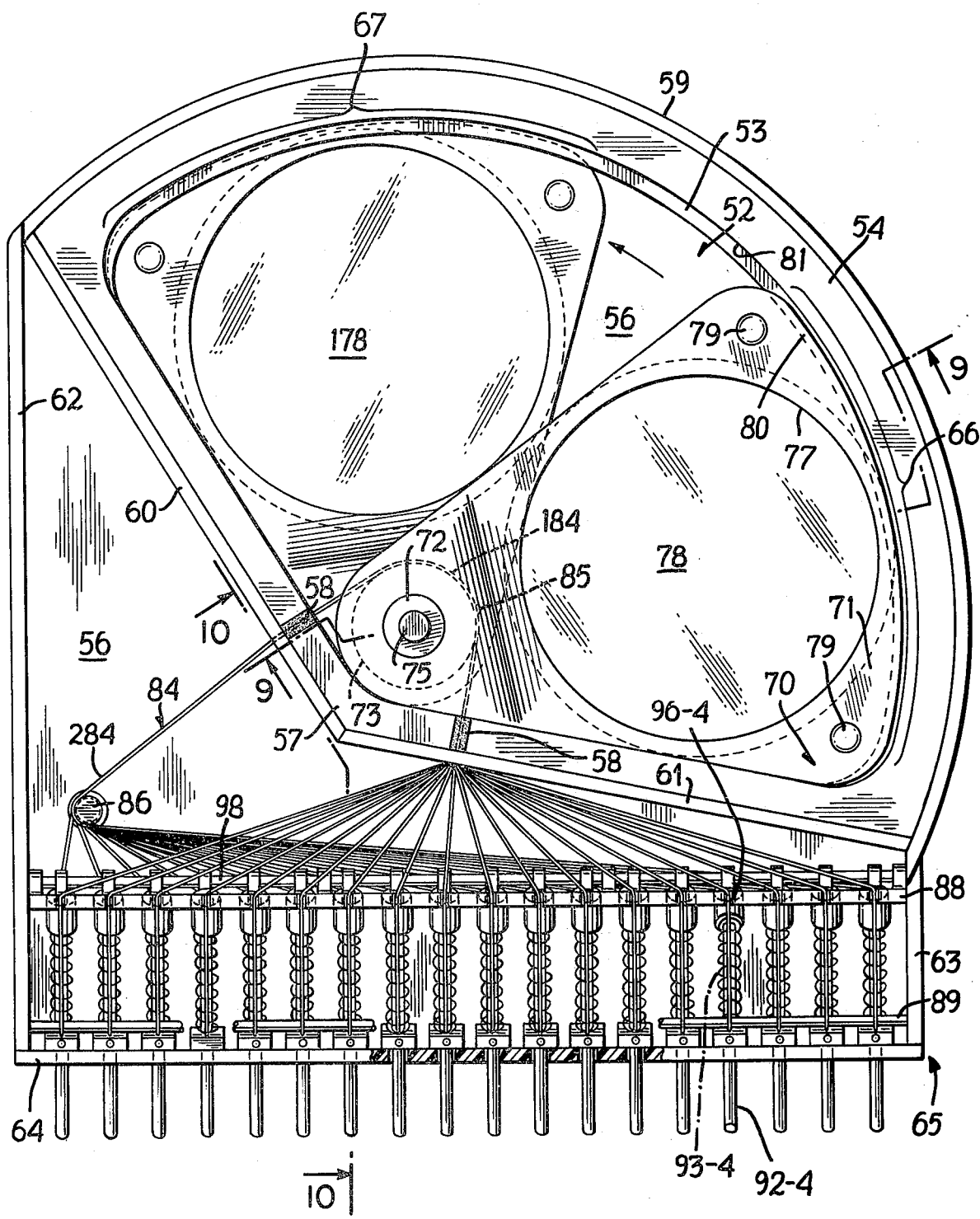
Figure 9:
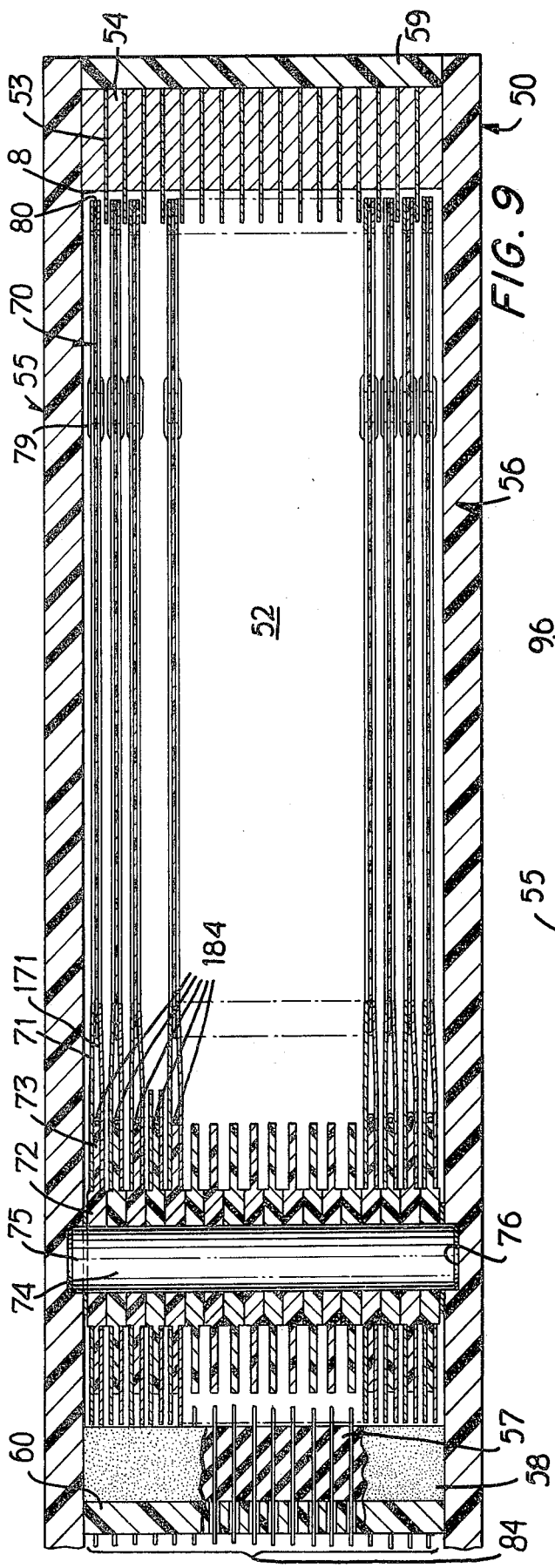
Figure 10:
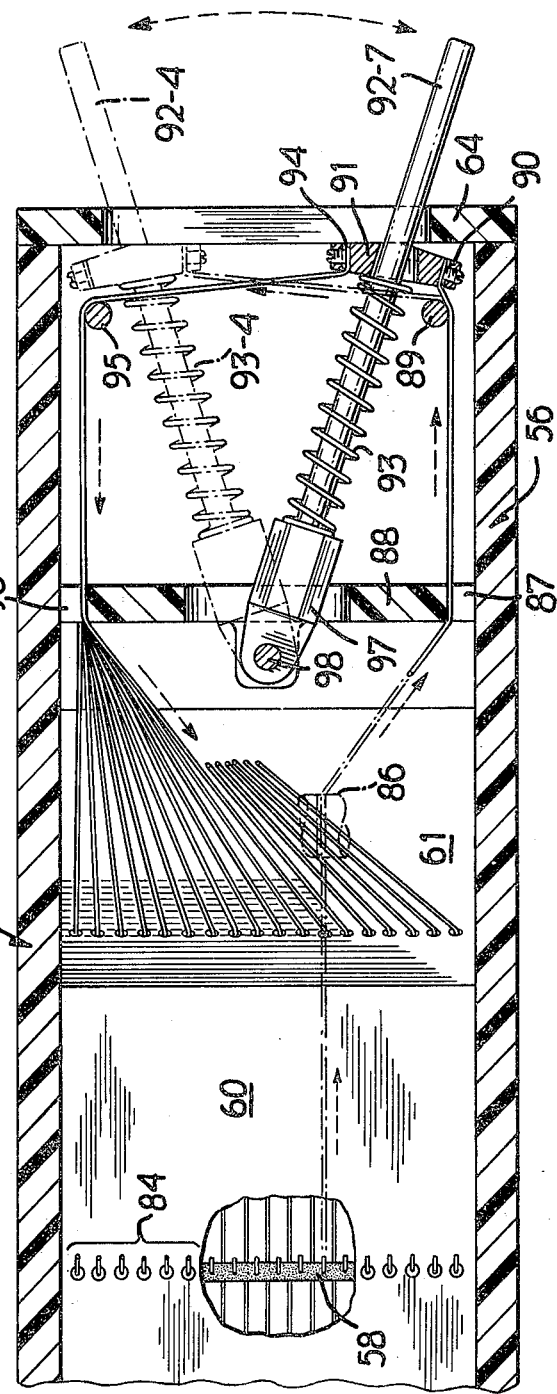

FIGS. 6 to 10 inclusive are views of other embodiments of equipment and the filters apparatus of the present invention designed for use therein, FIG. 6 being a side elevational view, with parts broken away and in section, of an enlarger for color paper print work having mounted therein the modified form of the color absortion filters unit required thereby;

FIG. 7 is an enlarged perspective view, with parts broken away and in section, of the color absorption filters unit of FIG. 6;

FIG. 8 is a plan view to still larger scale of the filters unit shown in FIG. 7, with parts broken away and in section, and with the cover plate removed;

FIG. 9 is a sectional view, with parts broken away, taken substantially on line 9—9 of FIG. 8; and FIG. 10 is a sectional view, with parts broken away, taken substantially on line 10—10 of FIG. 8.

Figure 1:
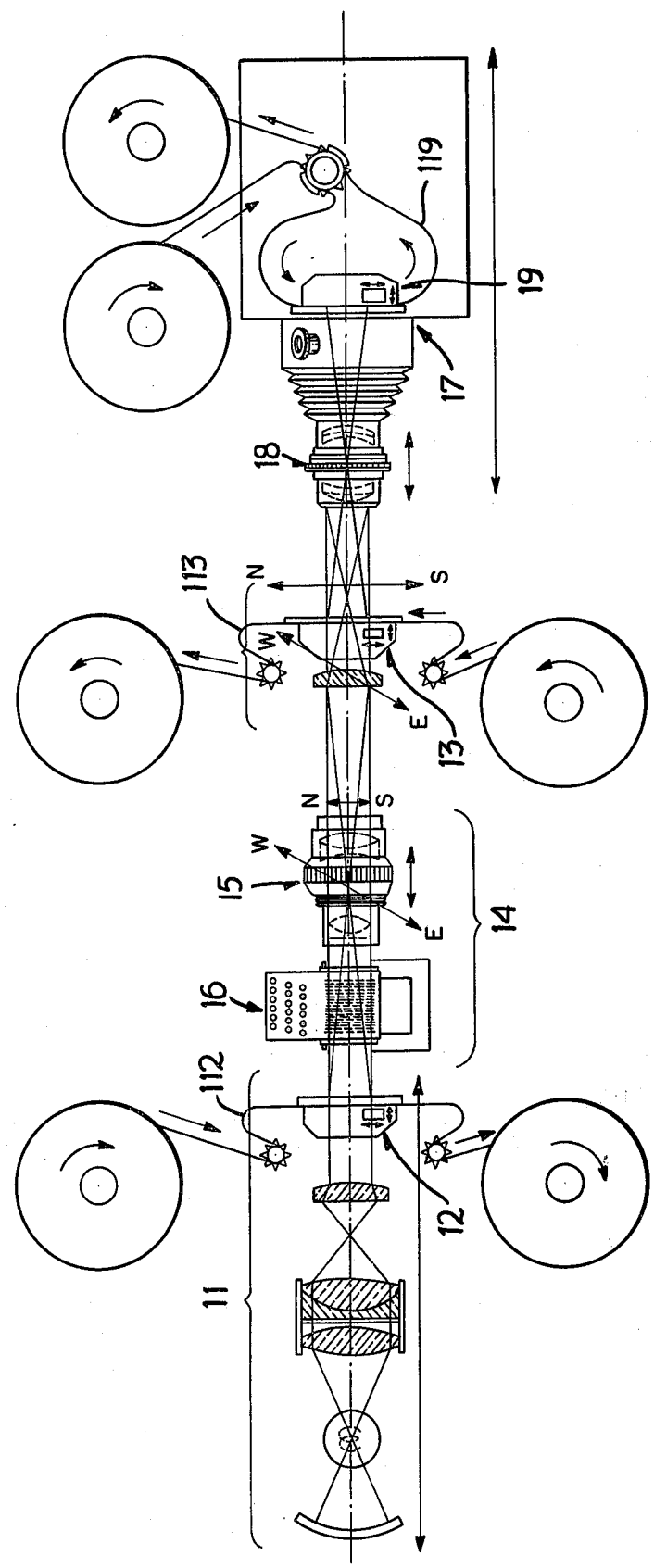
FIG. 1 is a diagrammatic view of an optical printer inclusive of an aerial image projector head and a master projector head in which is embodied, in accordance with the present invention, a form of color absorption filters apparatus.

It will be seen in FIG. 1 that an aerial image photographic recorder of the dual motion picture head type of printer may embody in a simple manner, in accordance with the present invention, a color absorption filters apparatus. The frame of the optical printer, therein shown in diagrammatic form, supports a light source, condenser and field lens assembly 11 associated with and including an aerial image projector head 12. A master projector head 13 is also provided in spaced relation to the aerial image projector head 12 for intervening mount of support structure at 14 on which is carried for transverse and longitudinal motion a transfer lens 15, serving as the projector lens of the aerial image head 12. The lens support at 14 also serves to mount between this lens 15 and the aerial image gate at 12 an embodiment 16 if the color absorption filters apparatus of the present invention. As is understood in this art all of the units of this printer, except the new color absorption filters unit 16, are optically aligned in succession in the manner indicated in FIG. 1 along with the printing camera assembly 17. Accordingly, as will be understood more fully hereinafter, the beam of light passing through the gate of the aerial image head 12, there to pick up the image of the foreground moving picture film 112 translating therethrough and to transmit it forward through the color correcting filters unit 16 and the transfer lens 15 for projection through the gate of the master projection head 13, there to impose upon the frames of the film 113 and the background images carried thereby such foreground images, so that the composite images will be carried forward by the beam into and through the camera lens 18 for printing upon the raw stock film 119 being translated through its gate 19. The disclosure of this Oxberry U.S. Pat. No. 3,040,619 of June 26, 1962 is incorporated herein by reference.

The embodiment of the color absorption filters apparatus or unit 16 of FIGS. 1 to 5 incl. includes a housing 20 comprising opposed end walls 21 and 22, sidewalls 23 and 24, and top and bottom walls 25 and 26 of any suitable material, such as a relatively rigid plastic or lightweight metallic composition, the interior surfaces of which will be suitably coated with anti-reflection composition. Together these walls define an internal chamber 27 which includes a storage section 28 and an optical operational section 29.

In order to simplify mechanisms or operative manipulators of this embodiment of the color absorption filters unit approximately the lower half of the chamber will be employed for the storage and operational positioning of the preferred gelatin filters and the remaining upper half of the chamber employed for the operative mechanisms and controls. The latter provide exterior manual engaging means and connections through the walls to the manipulators without necessitating liquid sealing of junctions of wall plates and controls which extend through an end wall in this liquid-free portion.

Accordingly, the lower portion of the internal chamber has its operational section 29 equipped with opposed and aligned window openings which are closed by opposed windows 30 and 31 that may be thick precision glass flats about one-eighth of an inch ($\frac{1}{8}$ inch) thick and about three inches (3 inches) in diameter. A filler elbow 32 has its inlet tube 33 anchored in a through hole in he end wall 22 for flowing the liquid bath into the lower half of the chamber, and for determining the fluid line or the surface of such bath. The junctures of the walls of the housing in this lower half are made liquid tight by suitable sealing composition, such as epoxy glue. Accordingly, each of the color filters, such as that indicated in the storage section 28 at 35, includes a suitable rectangular frame 36 having a circular hole 37 in which is exposed a disk portion 38 of a suitable gelatin filter sheet. It will be understood from FIG. 4 that when such a framed gelatin filter 35 is shifted from the storage section 28 to the windowed operational section 29, in the position 135 indicated in FIG. 4, the exposed disk of colored filter sheet 138 intercepts the entire optical beam which is to extend through from one window 30 to the opposite window 31 in the operational functioning of the photographic color recorder or printer.

Figure 4:
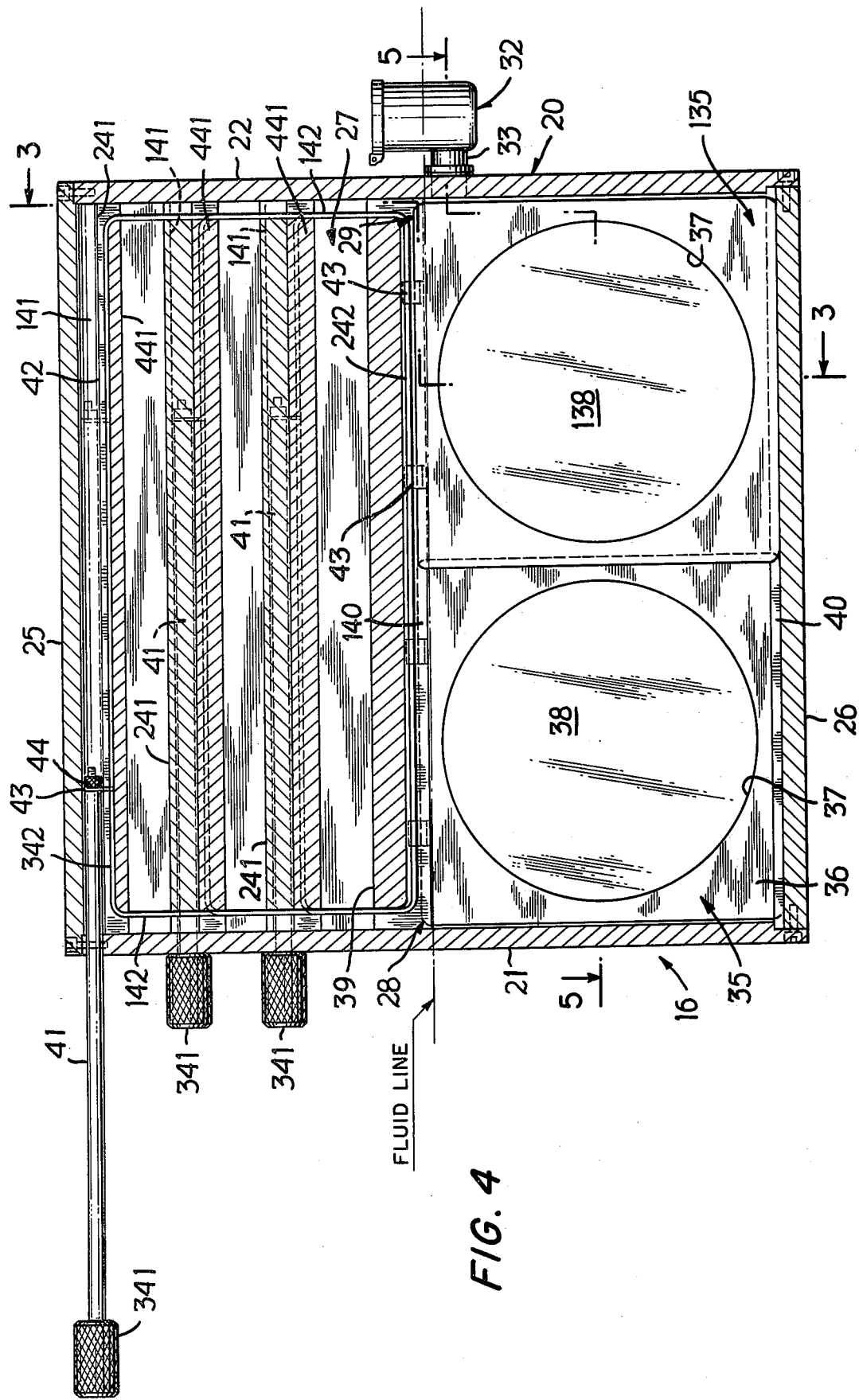
FIG. 4 is a sectional view taken substantially on line 4—4 of FIG. 2.

It will be seen from FIGS. 4 and 5 that the bottom plate 26 and intermediate transverse bar 39 are provided with opposed and transversely-spaced, parallel fins 40 and 140 which provide track channels in which top and bottom edges of such filter sheet frames 36 will slide back and forth between the storage section 28 and the operational section 29 while remaining submerged in the pool or bath of the liquid in the lower, substantially half-section of the chamber 27. Since these gelatin filters are to be maintained in positions of submergence in the pool or body of liquid located in the lower half of the chamber 27 have an index of refraction of about 1.52 the liquid constituting this bath should have an index of refraction of approximately the same value. Tetrachloroethylene may well serve this purpose since it has an index of refraction of about 1.51.

Since there are three primary colors of filters employed, i.e., cyan, magenta, and yellow, and it may be desired to provide color correction filters of color densities of six different values such a housing will perhaps store eighteen or three groups of six therein for selective movement to between the transversely aligned windows. This demands three different banks of operative controls to manipulate such color correction filters from their storage positions to their operational positions and vice versa. The color densities which one may desirably use are 0.025, 0.05, 0.10, 0.20, 0.40, and 0.80. Further it may be desirable to provide three extra filters in each group such as 0.40 so that these two may be moved to between the windows together to provide the equivalent of a single filter having a color density of 0.80. In any event, the controls which manipulate such filters between their stored and operative positions may be in the form of a plurality of thrust rods 41 (FIGS. 3 and 4) each slidably mounted in a hole extending through the front end wall 21. As will be best understood from FIG. 4 each of these thrust rods in each of the three banks thereof will be guided by channels 141 in suitable, longitudinally-extending sleepers or lateral bars 241 for proper guidance in push and pull action. It will also be seen that these rods 41 are suitably equipped with exterior grip knobs 341 for ready finger engagement to effect the desired push and pull action.

It will also be understood that the sleepers or bars 241 and additional such lateral members 441, as may be desired, are equipped with end notches for passage therethrough of up and down runs 142 of endless tethers or cable loops 42. Each such cable loop may be in the form of a monofilament of suitable plastic material, such as nylon. It will further be seen that the frame 36 of each filter 38 will be connected by suitable means to a lateral run 242 of such cable loop, such as by a pair of tabs 43, and that a top run 342 of each such loop will be fastened by suitable means, such as a clip 43 fastened to the end of the respective pull rod 41 by any suitable means 44. Accordingly, the filter at 138 has been moved from a position in the storage section in substantial transverse alignment with that shown at 38, for interception in its operational position 138 intervening the pair of side windows 30 and 31, by the pull out of the top knob 341 and its rod 41 in the first position in the top bank (FIG. 2).

It has been determined that the actual color densities obtained in the use of such filters mounted in this embodiment of the unit color absorption filters mechanism are linearly related to their calibrated values. Thus the choice of filters is proportional to the place values of a binary number system and any mechanism which counts in the binary system, e.g., a suitable computer, can be employed to insert a filter pack of required color density values. These identities and manipulative directions can be set up in tabular form or on guidance cards for ready manipulative changes by an operator in accordance therewith. For example, one such card may bear data of the following type:

| 181135 | (No. of Frames) | | | | | |
|---|---|---|---|---|---|---|
| X | | Y | | Z | | |
| SC. | 1 | 0 | 0 | 0 | 0 | 1 |
| # | 0 | 1 | 0 | 1 | 0 | 1 |
| 2 | 0 | 1 | 1 | 1 | 1 | 1 |

The number "181135" indicates the number of frames in a strip of raw stock film that is to use the same filters setting. The identities "X", "Y", and "Z" may represent certain indicia employed for identity in a computer record. The message in the box on the left, i.e., "SC. # 2", identifies "Scene No. two". It will be noted that the top row of lateral numbers in the main section box, which identify respectively the top bank of push and pull knobs 341, indicates that the first and last knob in the top bank are to be pulled out and remain in that position for the indicated number of frames. Also, the second row of lateral numbers indicates that the first knob on the right in the second bank is to be pulled out and then those therefollowing are alternately to remain in their inward positions and pulled out to their extended positions. The third row of lateral numbers indicates that all of the first five knobs in the bottom or third bank, i.e., from the right side, are to be pulled out while the sixth one on the left is to remain in its inward position.

The first use of the apparatus of the present invention was for the purpose of producing a motion picture film of a length to require about 25 minutes (at about 1440 frames per min.) to show. This strip of film was to include approximately 200 different scenes. If this about 200 different scenes film strip was produced by a double-projection-head, aerial image optical printer of the type taught in Oxberry U.S. Pat. No. 3,040,619 of June 26, 1962, by means of the prior practice of using different filters for many of those different scenes as expert skill developed by long experience would dictate so as to approach as closely as possible an acceptable production in which the images of the frames of each scene would be of good color and proper density (the latter being determinative of the brightness required) one would necessarily expect that approximately 90 to 100 of the scenes of the production film would require correction. This first film strip product produced by the present inventive apparatus and technique proved to be very good, requiring no corrections in any of the scenes, which effected a great financial economy due to the enormous amount of time, labor and expertise saved.

Enlargers for color paper print work are relatively expensive optical apparatus and an embodiment of the present color absorption filters devices can convert any of them into color enlargers by merely attaching such a unit to the lens board of each such enlarger. Such an embodiment requires a mounted orientation that positions the opposed spaced and aligned windows one above the other, i.e., the optical axis thereof is substantially vertical since that is the orientation of the optical axis of the conventional enlarger. As will be seen in FIG. 6 such an enlarger typically may embody a lamp house 45 below which is laterally located a suitable negative holder 46 with which is supported a suitable lens board and lens 47, with the usual lateral easel 48 mounted therebelow, and with an embodiment of a color absorption filters unit 50 mounted therebetween and supported by the lens board. Such orientation of this color absorption filters unit 50 requires that the chamber in which the plurality of filters are stored and transported from storage positions to operational positions be completely filled with the transparent colorless liquid in which they are to be submerged and manipulated between their storage and operative positions. Housing 51 includes a closed chamber 52 defined by a plurality of hollow, substantially fan-shaped laminae 53

(FIG. 9) intervened by similarly shaped spacers 54 and with the housing top plate 55 and companion bottom plate 56 closing off this chamber in a liquid tight manner so as to be filled with the body of liquid completely in a leakproof manner. It will be best understood from FIGS. 7 and 8 that the hollow fan-shaped laminae and spacers as assembled to provide the sidewalls of the chamber 52 have fitted between converging ends thereof a single V-shaped insert section 57 with the pair of end edges thereof spaced from the end edges of the two groups of laminae 53 and 54 by vertical slabs 58 of needle-pierceable synthetic rubber. An arcuate sidewall 59 and flat plate sidewalls 60 and 61 clad the outer edges of this chamber wall-defining laminated and insert section structure. Extensions of the top and bottom plates 55 and 56 and additional sidewall plate units 62, 63, and 64 together define a control mechanism housing addition or compartment 65. It will be understood from FIGS. 7 and 8 that the chamber 52 consists of a storage section 66 and an adjacent operative section 67. The operational section 67 has the top and bottom sections of plates 55 and 56 thereclosing provided respectively with plate glass windows 68 and 69 in substantial vertical alignment for passage of the recorder apparatus image-bearing beam therethrough.

Each of the color correction filters, preferably of the gelatin sheet type as previously indicated, is carried by a pivoted vane 70. As will be understood from FIGS. 7, 8 and 9 each swinging vane 70 comprises a pair of substantially triangular sheets 71 and 171 of suitable material, e.g., aluminum, having aligned holes in their tapered ends for mounting therebetween a wheel hub 72 for rotation thereby, and with this hub provided with an annular flange 73 inserted between such pair of triangular aluminum vane members. Aligned holes in these hubs received therethrough an axle shaft 74 (FIG. 9) which has its opposite ends 75 seated in cups or blind sockets 76 formed in the opposed faces of the top and bottom cover plates 55 and 56 (so as to avoid the need of gasketing otherwise through shaft-holes to avoid liquid leakage). Each such pivoted swinging vane has its pair of plates 71 and 171 provided with aligned circular holes 77 in which is exposed a circular section 78 of one of the gelating filter sheets confined between these vanes, both by the stress of warped shaping of the tapered ends of the vanes toward each other beyond the hub flange 73 and also by suitable rivets 79. Swing of any such vane 70 in a counterclockwise direction from the storage section 66 into the operational section 67 places the circular gelatin filter sheet area or disk in substantial alignment between the top and bottom plate glass windows 68 and 69, this circular filter area being referenced 178 in FIG. 8 in such operational position. It will also be noted that the arcuate edge zone 80 of each such fan-shaped vane (FIGS. 8 and 9) rides for guidance in the arcuate slot 81 defined opposite each arcuate section of the shim thereopposed with guidance by the extended arcuate edges of flanking structure such as a pair of laminae 53, or one of these and a flanking face of either of the top plate 55 or bottom plate 56. The mechanism to swing such filter vanes 70 from their storage positions, over to the left in FIGS. 7 and 8, i.e., counterclockwise to their operational positions, is effected by a substantially continuous or closed monofilament loop of nylon or the like which is lapped about each hub flange as will appear hereinafter. Such manipulative swing forward and back of each such filter-supporting vane is effected in a condition of submergence in a body of the chamber-filling liquid which is poured thereinto through the capped filler hole at 82 (FIG. 7).

As will be understood from FIGS. 7 to 10 inclusive each of the vanes 70 is swung arcuately forward and back by means of a substantially endless loop of monofilament cable 84 which has a run 184 lapped about the hub flange 73 and anchored thereto, such as at 85 (FIG. 8). This lapped run 184 extends through enlarged apertures in the cladding wall plates 60 and 61 (FIGS. 9 and 10) and through liquid-tight pierced holes in the synthetic rubber sealing strips 58. As will be understood from FIGS. 7 and 8 the left hand run 284 of the fourth loop 84 from the top will lap about guide post 86 to extend to the right for connection through guide notch 87 in the bottom edge of transverse guide board or plate 88 to extend forward for lap under transverse rod 89 and to connection with the bottom side at 90 of a floating rocker button 91 loosely carried on control lever 92 and biased by compression spring 93 carried thereby for slidable movement up and down along the inside face of slotted control panel 64 (FIG. 10) (this particular manual control lever actually being the seventh from the right in the bank so that it would be recognized as "92-7"). It will there be seen that the top side 94 of this slidable button is connected to the other end of the endless monofilament cable loop 84 to lap over a top transverse guide rod 95 for extension back through a top guide notch 96 in the guide plate 88 for extension back to the left to a hole in partition cladding wall plate 61 for entry through the right side needle pierceable synthetic rubber slab 58 and the lapping run 184 about the vane hub flange 73.

It will be seen from FIGS. 7 and 8 that the fourth filter vane from the top has been swung over to the left into the operational section of the chamber, in the position at 178, by swing up of the manual control 92-4 to its top broken line position shown in FIG. 10 and the full line position shown in FIGS. 7 and 8. Each control lever 92, such as that at 92-7 in FIG. 10, has its inner end socketed in a metallic cup 97 which in turn is pivotally mounted upon a transverse pivot bar 98 supported along the rear face of and by the guide plate 88. It will thus be understood that manual swing upward and down of the control levers 92 selectively swing the filter vanes 70 from the storage section of the chamber 52 counterclockwise over into the operational section thereof for location of such filter 178 between the aligned beam passing windows 68 and 69 for imposing the effect of each such filter upon such image carrying beam in the enlarger operation.

It will thus be understood that in the embodiment of FIGS. 6 to 10 inclusive the manual controls are in the form of swingable lever arms with each connected at one point to its associated cable loop, and that each of the filters is individually supported by a pivoted vane that is connected to one of the lever arms for selective arcuate filter vane swing. For this purpose the cable loop which is associated with each such vane is connected thereto at a point eccentric of the pivot axis of the latter. This embodiment is particularly designed for practical use with an enlarger in which the beam path and lens axis are arranged substantially vertical. Thus the housing of this color absorption filters apparatus is provided with suitable mounting means whereby the axes of these vanes are oriented substantially vertically with the spaced windows thereof being substantially aligned one above the other and with the interior housing chamber filled with the body of liquid for maintaining the vanes and their filters submerged, and with the inside faces of these windows constantly bathed by this liquid.

As to the particular transparent colorless liquid which is chosen to provide the body or bath thereof in the embodiments of the color absorption filters devices of the present invention it has been indicated herein that, in addition to compatibility with respect to the compositions and surfaces of structural elements in or contacted thereby and avoidance of toxicity, the liquid should have an index of refraction substantially equal to that of the material of the filters. When such filters are of the gelatin type, as may be preferred particularly in view of the ready availability from Eastman Kodak Company of standard color filters having accurate and reliable ratings inclusive of an index of refraction of about 1.52, a reliable such liquid may be tetrachloroethylene which has an index of refraction of about 1.51 at normal operating temperatures of such photographic color recorders, i.e., aerial image printers and enlargers. The use of this liquid has been proposed in optical film gates and for printing motion-picture films immersed therein, but the applicant does not know of any proposed use thereof in any color absorption filters apparatus for photographic color recorders. Such proposals will be found in articles in the Journal of the SMPTE (Society of Motion Picture and Television Engineers) Vol. 66, pages 607, et seq., (p. 608), Oct. 1957; and Vol. 79, pages 333, et seq., (p. 336), April 1970.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limitng sense.

It is also to be understood that the following claims are intended to cover all of the generic and specific features of the invention which, as a matter of language, might be said to fall therebetween.

Having described my invention, what I claim as new and desire to secure by Letters Patent is the novel subjects matter defined in the following claims.

1. Apparatus for selectively inserting into and withdrawing color absorption filters from the light beam paths of photographic color recorders; comprising
    1. a housing defining a plural-section chamber and having opposed and spaced sidewalls with the latter in an operational section of the chamber provided with opposite windows closed by suitable optical transparencies through which the light beam path of a photographic color recorder may extend upon suitable beam-intercepting support of said housing in a certain orientation dictated by the predetermined path of such beam;
    2. a stack of planar color absorption filters, having substantially uniform indices of refraction and arranged in groups within a storage section of the chamber located offset from the windowed operational section with those in one group being of the color cyan, those in a second group being of the color magenta and those in the third group being of the color yellow;
    3. manipulative means capable of moving individually and selectively each such filer from the stack in the storage section to positions of stacking between said windows substantially normal to the light beam path extending therethrough and back again into the storage section;
    4. means sealing in a liquid-tight manner at least the sides and bottoms of the entire chamber including its storage and operational section; and
    5. a body of transparent colorless liquid having an index of refraction substantially equal to that of the filters and located in the chamber and its sections in a quantity to maintain immersion therein of said filters in their positions of storage and operation and movements therebetween.

2. Apparatus for selectively modulating the color of light beam paths of photographic color recorders; comprising
    1. a housing defining a plural-section chamber and having opposed and spaced sidewalls with the latter in an operational section of the chamber provided with substantially aligned windows closed by suitable optical transparencies through which the light beam path of a photograhic color recorder may extend upon suitable beam-intercepting support of said housing in a certain orientation dictated by the predetermined path of such beam;
    2. a plurality of substantially parallel, planar color absorption filters, having substantially uniform indices of refraction and arranged in groups within a storage section of the chamber located offset from the wndowed operational section with those in one group being of the color cyan, those in a second group being of the color magenta and those in the third group being of the color yellow;
    3. guide means defining substantially parallel paths of planar motion of said filters between the chamber storage and operational sections and support in substantially parallel positions intervening said windows with their orientations in such positions being substantially normal to the light beam path of extension through the aligned windows;
    4. manipulative means capable of moving individually each such filter along its path of planar motion between the storage section and the position intervening said windows;
    5. means sealing in a liquid-tight manner at least the sides and bottoms of the chamber storage and operational sections including all fixed structural joints and parts thereof which are normally immersed in operational use of the apparatus; and
    6. a body of transparent colorless liquid having an index of refraction substantially equal to that of the filters and located in the chamber sections and in a quantity to maintain immersion therein of said filters in their positions of storage and operation and movements therebetween.

3. The color absorption filters apparatus of claim 2 characterized by said manipulative means including a plurality of banks of controls individually accessible from outside of said housing and means individually connecting each such control to one such filter for moving the latter by the former.

4. The color absorption filters apparatus of claim 3 characterized by each such individual means connecting one of said controls to one of said filters being in the form of pull cable means to shift the filter to which it is connected back and forth between the storage and operative positions of this filter.

5. The color absortion filters apparatus of claim 4 characterized by said cable means for each control including a substantially continuous loop connected at one location to this control and at another location to the movable filter associated therewith.

6. The color absorption filters apparatus of claim 5 characterized by said controls being in the form of push and pull thrust rods with each connected at one point to its associated pull cable loop.

7. The color absorption filters apparatus of claim 6 characterized by said controls being in the form of three separate banks with those of one such bank being associated with the group of cyan colored filters, those of another such bank being associated with the group of magenta colored filters, and those of the third bank being associated with the group of yellow colored filters.

8. The color absorption filters apparatus of claim 5 characterized by said controls being in the form of swingable lever arms with each connected at one point to the associated cable loop.

9. The color absorption filters apparatus of claim 8 characterized by each of said filters being individually supported by a pivoted vane with each of the latter connected to one of said lever arms for selective arcuate swing of each said filter vane.

10. The color absorption filters apparatus of claim 9 characterized by said filters respectively being carried for such swing by a separate such vane with the cable loop associated therewith being connected to this vane at a point eccentric of the pivot axis of the latter.

11. The color absorption filters apparatus of claim 10 characterized by means to mount the housing thereof in a manner which orients the axes of said vanes substantially vertically with said windows being substantially aligned one above the other and with the chamber substantially filled with such liquid for maintaining said vanes and their filters submerged in such liquid, and with the inside faces of said windows constantly bathed by the liquid.

* * * * *

UNITED STATES PATENT AND TRADEMARK OFFICE
CERTIFICATE OF CORRECTION

PATENT NO. : 4,056,317
DATED : November 1, 1977
INVENTOR(S) : John Hopkins Lewis It is certified that error appears in the above-identified patent and that said Letters Patent are hereby corrected as shown below:

Column 1, line 57, for "apreciable" read --appreciable--. Column 2, lines 21 and 22, for "individually selectively" read --individually and selectively--. Column 3, line 57, for "if" read --of--. Column 4, line 37, for "he" read --the--. Column 7, line 44, for "gelating" read --gelatin--. Column 9, line 40, for "invention which," read --invention herein described, and all statements of the scope of the invention which,--; line 66 (claim 1, §3, line 2) for "filer" read --filter--. Column 10, line 20 (claim 2, §1, line 6) for "photograhic" read --photographic--; line 28 (claim 2, §2, line 5) for "wndowed" read --windowed--; line 66 (claim 5, line 1) for "absortion" read --absorption--.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*